Patented Aug. 21, 1945

2,383,289

UNITED STATES PATENT OFFICE

2,383,289

ROSIN CONDENSATION PRODUCTS AND METHOD OF PRODUCING

Edward A. Bried, Newport, Del., assignor to Hercules Powder Company, Wilmington, Del., a corporation of Delaware No Drawing. Application June 2, 1944,
Serial No. 538,551

12 Claims. (Cl. 260—98)

This invention relates to new and improved derivatives of rosin and to methods for their production; more particularly, it relates to improved condensation products of natural rosin and an aldehyde, esters and salts thereof, and to methods for their production.

Various wetting, dispersing, and flotation agents have been produced from natural rosin, rosin esters, dehydrogenated rosin, etc. Agents of this type have not always proved entirely satisfactory, especially when they are used in hard water. Certain of these derivatives are also known to undergo an undesirable color change when subjected to normal environmental conditions.

Now, in accordance with this invention, novel and highly useful materials which form the base for improved wetting and dispersing agents and which comprise derivatives of condensation products of natural rosin with aldehydes have been prepared by hydrogenation of such condensation products. The condensation of rosin with an aldehyde, such as formaldehyde, in the presence of an organic carboxylic acid having an ionization constant of at least $1 \times 10^{-6}$ provides a product which is believed to contain a rosin-carbinol ester. The production of these novel derivatives in accordance with this invention is carried out by contacting such a condensation product of a natural rosin and an aldehyde prepared in the presence of an organic carboxylic acid having an ionization constant of at least $1 \times 10^{-6}$, with hydrogen in the presence of an active hydrogenation catalyst until the condensation product has become saturated with hydrogen to an extent equivalent to at least 50% saturation of the rosin nucleus. Alternatively, the hydrogenation may be carried out on the reaction product of the described condensation product of a natural rosin and an aldehyde with an aliphatic acid having from 6 to 18 carbon atoms, such a reaction product being an ester formed by an ester interexchange reaction. The hydrogenated products are useful in the form obtained by the above procedures, or they may be saponified, or neutralized to form a salt, or the saponified or neutralized product may be sulfated. The salts of the hydrogenated product or the saponified hydrogenated products are particularly useful as wetting, dispersing or flotation agents.

Having thus indicated in a general way the nature of this invention, the following examples are included to illustrate the preparation of the novel hydrogenated condensation products. In the specification and in the claims, the parts and percentages are by weight unless otherwise specified.

Example 1

Three hundred and forty parts of gum rosin (acid number 165) in 200 parts of glacial acetic acid were refluxed during 6 hours with 35 parts of paraformaldehyde. The product was cooled, dissolved in diethyl ether, and washed with water until free of acid. The ether solution was dried over anhydrous calcium sulfate, the solvent removed by distillation, and the liquid residue sparged with nitrogen gas for 30 minutes. The reaction product, believed to contain rosin-carbinol acetate, was obtained in a practically quantitative yield. The product analyzed as follows:

|  | Actual | Theoretical for rosin-carbinol acetate |
|---|---|---|
| Acid number | 137.5 | 136.0 |
| Drastic saponification No | 268.0 | 272.0 |
| Melting point, °C | 80.0 |  |
| Index of refraction at 20° C | 1.5394 |  |
| Thiocyanogen number | 66.0 | 56.0 |

A solution of 100 parts of the above gum rosin-carbinol acetate in 300 parts of glacial acetic acid was contacted with hydrogen in the presence of a platinum oxide catalyst for a period of 1 hour at 24° to 26° C. The per cent hydrogen absorbed (grams of hydrogen per gram of ester) was 0.7% (theory for two double bonds of the rosin nucleus is 1.06%). The hydrogenated gum rosin-carbinol acetate was characterized as follows:

|  | Actual | Theoretical for hydrogenated rosin-carbinol acetate |
|---|---|---|
| Acid number | 135.0 | 134.0 |
| Drastic saponification No | 258.0 | 268.0 |
| Melting point, °C | 85.0 |  |
| Index of refraction at 20° C | 1.5260 |  |
| Thiocyanogen number | 15.0 | 0 |

The sodium salt of this hydrogenated rosin-carbinol acetate was formed by neutralizing an ethanol solution of the ester with 0.5N alcoholic sodium hydroxide. The sodium salt was soluble in hard water and upon shaking produced excellent suds. It is an excellent wetting and dispersing agent for use in hard water.

Example II

Fifty parts of the hydrogenated gum rosin-carbinol acetate obtained as in Example I, prior to neutralization, were dissolved in ethanol and refluxed for 3 hours with a quantity of alcoholic sodium hydroxide solution corresponding to the saponification number of the ester. The alcohol was removed by distillation and the residue dried under vacuum. The latter was extracted with petroleum ether, dissolved in water, and acidified with dilute hydrochloric acid. The liberated rosin-carbinol was dissolved in diethyl ether, washed with water until neutral, and recovered by distillation of the solvent. The hydrogenated gum rosin-carbinol was characterized as follows:

|  | Actual | Theoretical |
| --- | --- | --- |
| Acid number | 147.0 | 150.0 |
| Drastic saponification No | 156.0 | 150.0 |
| Zerewitinoff hydroxyl, percent | 5.5 | 5.1 |

It is useful as a softening agent and as a base for derivatives.

The hydrogenated gum rosin-carbinol was converted to its sodium salt by neutralizing the ethanol solution of the ester with 0.5N alcoholic sodium hydroxide. The alcohol was removed by distillation and the residue dried in a vacuum oven at 60° C., 35 mm. mercury. The sodium salt of the hydrogenated gum rosin-carbinol was a yellow powder soluble in hard water which upon shaking produced good suds.

Example III

Twenty parts of the hydrogenated gum rosin-carbinol prepared as in Example II were dissolved in 72 parts of diethyl ether. To this were added dropwise, with stirring and at room temperature, 7 parts of chlorosulfonic acid for over a period of ½ hour. After 2 hours the mixture was treated in a dropwise manner with 150 parts of a 10% aqueous solution of sodium bicarbonate. The mixture was then completely neutralized with a solution of alcoholic sodium hydroxide. The solvents were removed by distillation and the residue extracted with diethyl ether. The soluble portion amounted to 6 parts. Extraction of the ether-insoluble portion with hot ethanol yielded 24 parts of a yellow-colored powder. This product, the disodium salt of the acid sulfate of the hydrogenated rosin-carbinol, was soluble in hard water and produced excellent suds upon shaking. This product also had a marked detergent action in hard water. The salt analyzed as follows:

|  | Actual | Theoretical |
| --- | --- | --- |
| Sulfur percent (Parr bomb) | 6.6 | 6.72 |

Example IV

A mixture of 70 parts of the gum rosin-carbinol acetate of Example I before hydrogenation and 50 parts of oleic acid was heated at a temperature ranging from 230° to about 270° C. for a period of 5 hours. A flow of nitrogen through the hot liquid accelerated the rate of distillation of the acetic acid. The temperature was raised to about 280° C. and held for 1 hour to complete the reaction. The residue consisting of about 90 parts was a dark red-colored liquid believed to contain rosin-carbinol oleate formed by an ester exchange reaction. The product had the following analysis:

|  | Actual | Theoretical |
| --- | --- | --- |
| Acid number | 106 | 88 |
| Drastic saponification No | 178 | 176 |

The rosin-carbinol oleate was hydrogenated according to the hydrogenation procedure given in Example I. The extent of the saturation, with respect to the double bonds of the rosin nucleus, was substantially the same as that of Example I.

The hydrogenated rosin-carbinol oleate was converted to its sodium salt by neutralizing an ethanol solution of the hydrogenated ester with 0.5N alcoholic sodium hydroxide. The alcohol was removed by distillation and the residue dried in a vacuum oven at 60° C., 35 mm. mercury. The sodium salt of the hydrogenated rosin-carbinol oleate was soluble in cold hard water and produced very good suds upon shaking. It also served as a very suitable compounding agent in vegetable oil soaps.

The above examples illustrate the hydrogenation process of the invention and the formation of derivatives of the hydrogenated rosin-aldehyde condensation products, many of those derivatives having novel surface-active properties. In carrying out the condensation reaction of rosin with an aldehyde, it has been found that the use of an organic carboxylic acid, having an ionization constant of at least $1 \times 10^{-5}$, as a catalyst, directs the reaction in such a way as to produce primarily a carbinol of the rosin in which there is apparently formed a new carbon-to-carbon linkage. As the condensation reaction proceeds there is concurrently formed the rosin-carbinol ester of the organic acid employed as the catalyst rather than the free carbinol.

The gum rosin used in the examples may be replaced by wood rosin or the acids obtainable from wood or gum rosin, such as d-abietic acid, l-abietic acid, d-pimaric acid, l-pimaric acid, sapinic acid, sylvic acid, or other rosin acids which possess the hydrocarbon nucleus $C_{19}H_{29}$.

Various other aldehydes or aldehyde-yielding substances may be employed in lieu of paraformaldehyde exemplified herein. For example, trioxymethylene, formalin, formaldehyde gas, acetaldehyde, benzaldehyde, etc., or any operable equivalent therefor may be used. However, in carrying out the rosin-aldehyde condensation it is preferable to use formaldehyde or a substance which will easily liberate formaldehyde upon heating.

As has been indicated previously, the catalyst employed herein to effect the rosin-aldehyde condensation may be any organic carboxylic acid having an ionization constant of at least $1 \times 10^{-5}$. Thus, such organic carboxylic acids as formic acid, acetic acid, propionic acid, fumaric acid, malic acid, oxalic acid, mucic acid, benzoic acid, phthalic acid, citric acid, etc., may be employed instead of the glacial acetic acid used in the examples of this invention. The concentration of the acid should be at least the theoretical amount required for esterification of the carbinol and preferably two to four times the theoretical amount. It is desirable to use an organic carboxylic acid which functions as a mutual solvent for both the rosin and the aldehyde, such as glacial acetic acid. It is not essential that the condensation reaction of the rosin and aldehyde be carried out in anhydrous media.

The hydrogenation of the rosin-aldehyde condensation products may be satisfactorily effected in the presence of active hydrogenation catalyst other than the platinum oxide exemplified, for example nickel, Raney nickel, palladium, etc. The term "Raney nickel" used here and in the claims refers to a nickel alloy catalyst of the type prepared in the manner described in the U. S. Patent 1,628,190 of Murray Raney, whereby an alloy of nickel with a metal such as silicon and aluminum in various proportions, and in finely-divided form, is treated with a solvent for the silicon or aluminum which does not attack the nickel. As a consequence, the silicon and aluminum are dissolved from the alloy.

The temperature required for the condensation reaction may vary over wide ranges, as for example from about 80° to about 150° C. However, in general, the mixture of a rosin, an aldehyde and the organic carboxylic acid is heated at a temperature at which refluxing occurs.

In reacting the rosin-aldehyde condensation product with an aliphatic carboxylic acid of 6 to 18 carbon atoms, to effect the ester-exchange, besides oleic acid there may be used such acids as linoleic acid, linolenic acid, stearic acid, palmitic acid, myristic acid, lauric acid, capric acid, caprylic acid, caproic acid, etc. The temperature for effecting this ester-exchange reaction may range from about 90° to about 350° C., but preferably will be in the range of about 200° to 300° C. The time may vary from 1 to about 12 hours, depending upon the various acids used.

The temperature range for the hydrogenation process shown herein, when platinum oxide or another noble metal catalyst is used may be from about 20 to about 100° C., depending upon the conditions and the rate at which it is desired to effect hydrogenation. When a nickel type catalyst, such as Raney nickel, is used a temperature ranging from about 100° to about 300° C. may be employed.

Any of the sulfation agents generally employed in the art may be used in lieu of chlorosulfonic acid to prepare the sulfated hydrogenated rosin-carbinol such as concentrated sulfuric acid, sulfur trioxide, oleum, acetyl sulfuric acid, etc. In carrying out the sulfation, the hydrogenated rosin-carbinol is preferably dissolved in an organic solvent which is inert under the reaction conditions. Thus, instead of diethyl ether as used in the examples, there may be employed carbon tetrachloride, saturated petroleum hydrocarbons, such as hexane, heptane, etc. A 10 to about 50% concentration of the hydrogenated rosin-carbinol in the above solvents will be satisfactory. A 1 to 30% excess of sulfating agent and a temperature range of about −10° to about 30° C. are satisfactory. The fact that the rosin-carbinol esters are hydrogenated prior to sulfation prevents various side reactions from occurring at the double bonds, consequently, better yields and purer products may be obtained.

In preparing salts of the hydrogenated products produced in accordance with this invention, there may be employed, besides sodium hydroxide, potassium hydroxide, ammonium hydroxide, sodium carbonate, sodium bicarbonate, potassium carbonate, various organic amines such as methylamine, dimethylamine, pyridine, etc. If desired, the salts may be purified by extracting the crude material with hot ethanol, filtering the solution, and then evaporating to dryness.

These salts of hydrogenated rosin-aldehyde condensation products are particularly advantageous because of their detergent and emulsifying action in hard water. The light color and resistance to change upon exposure to oxygen, which characterize the various products of this invention, make them very suitable to use in combination with various fatty acid soaps.

What I claim and desire to protect by Letters Patent is:

1. The method of improving a material selected from the group consisting of a condensation product of a natural rosin with an aldehyde obtained by condensation in the presence of an organic carboxylic acid having an ionization constant of at least $1 \times 10^{-6}$ and a reaction product of said condensation product with an aliphatic acid having from 6 to 18 carbon atoms, which comprises contacting said material with hydrogen in the presence of an active hydrogenation catalyst until said material has become saturated with hydrogen to an extent equivalent to at least 50% saturation of the rosin nucleus of said material, hydrolyzing the hydrogenated material to liberate the carbinol and thereafter contacting said carbinol with a sulfating agent to produce a sulfated product.

2. The method of improving a condensation product of a natural rosin and formaldehyde obtained by condensation in the presence of an organic carboxylic acid having an ionization constant of at least $1 \times 10^{-6}$, which comprises contacting said product with hydrogen in the presence of an active nickel catalyst at a temperature within the range of about 100° to about 300° C. until said product has become saturated with hydrogen to an extent equivalent to at least 50% saturation of the rosin nucleus of said product, hydrolyzing the hydrogenated condensation product to liberate the carbinol, and thereafter contacting said carbinol with a sulfating agent to produce a sulfated product.

3. The method of improving a condensation product of a natural rosin and formaldehyde obtained by condensation in the presence of glacial acetic acid, which comprises contacting said condensation product with hydrogen in the presence of a Raney nickel catalyst at a temperature within the range of about 150° to about 250° C. until said product has become saturated with hydrogen to an extent equivalent to at least 50% saturation of the rosin nucleus of said product, hydrolyzing the hydrogenated condensation product to liberate the carbinol, contacting said carbinol with chlorosulfonic acid, and thereafter neutralizing to produce a salt of the sulfated product.

4. The method of improving a condensation product of a natural rosin and formaldehyde obtained by condensation in the presence of glacial acetic acid, which comprises contacting said condensation product with hydrogen in the presence of a Raney nickel catalyst at a temperature within the range of about 150° to about 250° C. until said product has become saturated with hydrogen to an extent equivalent to at least 50% saturation of the rosin nucleus of said product, hydrolyzing the hydrogenated condensation product to liberate the carbinol and thereafter contacting said carbinol with a sulfating agent to produce a sulfated product.

5. The method of improving a condensation product of a natural rosin and formaldehyde obtained by condensation in the presence of an organic carboxylic acid having an ionization constant of at least $1 \times 10^{-6}$, which comprises contacting said product with hydrogen in the presence of an active noble metal hydrogenation catalyst at a temperature within the range of about 20° to about 100° C. until said product has become saturated with hydrogen to an extent equivalent to at least 50% saturation of the rosin nucleus of said product, hydrolyzing the hydrogenated condensation product to liberate the carbinol and thereafter contacting said carbinol with a sulfating agent to produce a sulfated product.

6. The method of improving a reaction product obtained by contacting an aliphatic acid having from 6 to 18 carbon atoms with a condensation product of a natural rosin with formaldehyde obtained by condensation in the presence of an organic carboxylic acid having an ionization constant of at least $1\times10^{-6}$, which comprises contacting said reaction product with hydrogen in the presence of an active noble metal hydrogenation catalyst at a temperature within the range of about 20° to about 100° C. until said reaction product has become saturated with hydrogen to an extent equivalent to at least 50% saturation of the rosin nucleus of said product, hydrolyzing the hydrogenated reaction product to liberate the carbinol and thereafter contacting said carbinol wtih a sulfating agent to produce a sulfated product.

7. The method of improving a reaction product obtained by contacting oleic acid with a condensation product of a natural rosin with formaldehyde obtained by condensation in the presence of glacial acetic acid, which comprises contacting said reaction product with hydrogen in the presence of an active platinum oxide hydrogenation catalyst at a temperature within the range of about 20° to about 40° C. until said reaction product has become saturated with hydrogen to an extent equivalent to at least 50% saturation of the rosin nucleus of said product, hydrolyzing the hydrogenated reaction product to liberate the carbinol and thereafter contacting said carbinol with a sulfating agent to produce a sulfated product.

8. As an improved product a material selected from the group consisting of a condensation product of a natural rosin with an aldehyde obtained by condensing in the presence of an organic carboxylic acid having an ionization constant of at least $1\times10^{-6}$ and a reaction product of said condensation product with an aliphatic acid having from 6 to 18 carbon atoms, said material having been contacted with hydrogen in the presence of an active hydrogenation catalyst until said material has become saturated with hydrogen to an extent equivalent to at least 50% saturation of the rosin nucleus of said material, the hydrogenated material hydrolyzed to liberate the carbinol and said carbinol thereafter contacted with a sulfating agent to produce a sulfated product.

9. As an improved product a condensate of a natural rosin and formaldehyde obtained by condensing in the presence of an organic carboxylic acid having an ionization constant of at least $1\times10^{-6}$, said condensate having been contacted with hydrogen in the presence of an active nickel catalyst at an elevated temperature until said condensate has become saturated with hydrogen to an extent equivalent to at least 50% saturation of the rosin nucleus of said condensate, the hydrogenated condensate hydrolyzed to liberate the carbinol and said carbinol thereafter contacted with a sulfating agent to produce a sulfated product.

10. As an improved product a condensate of a natural rosin and formaldehyde obtained by condensing in the presence of glacial acetic acid, said condensate having been contacted with hydrogen in the presence of a Raney nickel catalyst at a temperature within the range of about 150° to about 250° C. until said condensate has become saturated with hydrogen to an extent equivalent to at least 50% saturation of the rosin nucleus of said condensate, the hydrogenated condensate hydrolyzed to liberate the carbinol, said carbinol contacted with chlorosulfonic acid, and thereafter neutralized to produce a salt of the sulfated product.

11. An improved reaction product obtained by contacting an aliphatic acid having from 6 to 18 carbon atoms with a condensation product of a natural rosin with formaldehyde obtained by condensation in the presence of an organic carboxylic acid having an ionization constant of at least $1\times10^{-6}$, contacting the resulting material with hydrogen in the presence of an active noble metal hydrogenation catalyst at a temperature within the range of about 20° to about 100° C. until said reaction product has become saturated with hydrogen to an extent equivalent to at least 50% saturation of the rosin nucleus of said product, hydrolyzing the hydrogenated reaction product to liberate the carbinol and thereafter contacting said carbinol with a sulfating agent to produce a sulfated product.

12. An improved reaction product obtained by contacting oleic acid with a condensation product of a natural rosin and formaldehyde obtained by condensation in the presence of glacial acetic acid, contacting the resulting ester with hydrogen in the presence of an active platinum oxide hydrogenation catalyst at a temperature within the range of about 20° to about 40° C. until said reaction product has become saturated with hydrogen to an extent equivalent to at least 50% saturation of the rosin nucleus of said product, hydrolyzing the hydrogenated reaction product to liberate the carbinol and thereafter contacting said carbinol with a sulfating agent to produce a sulfated product.

EDWARD A. BRIED.